US009739656B2

(12) United States Patent
Kieser et al.

(10) Patent No.: US 9,739,656 B2
(45) Date of Patent: Aug. 22, 2017

(54) DYNAMIC SCALE THAT USES MULTIPLE WEIGHT MEASUREMENTS OF AN OBJECT IN CONTINIOUS MOTION TO DERRIVE A WEIGHT VALUE AND A QUALITY VALUE, WHERE THE QUALITY VALUE DETERMINES THE VALIDITY OF THE WEIGHT VALUE

(71) Applicants: Axel Kieser, Berlin (DE); Volker Baum, Berlin (DE); Andreas Blume, Berlin (DE); Karsten Von der Waydbrink, Berlin (DE)

(72) Inventors: Axel Kieser, Berlin (DE); Volker Baum, Berlin (DE); Andreas Blume, Berlin (DE); Karsten Von der Waydbrink, Berlin (DE)

(73) Assignee: Francotyp-Postalia GmbH, Berlin (DE)

( * ) Notice: Subject to any disclaimer, the term of this patent is extended or adjusted under 35 U.S.C. 154(b) by 121 days.

(21) Appl. No.: 14/740,506

(22) Filed: Jun. 16, 2015

(65) Prior Publication Data

US 2015/0362357 A1     Dec. 17, 2015

(30) Foreign Application Priority Data

Jun. 16, 2014   (DE) .................. 10 2014 211 515

(51) Int. Cl.
*G01G 19/00* (2006.01)
*G01G 19/03* (2006.01)
(Continued)

(52) U.S. Cl.
CPC ........... *G01G 19/005* (2013.01); *G01G 11/16* (2013.01); *G01G 21/22* (2013.01); *G01G 21/23* (2013.01); *G01G 23/06* (2013.01); *G01G 23/14* (2013.01)

(58) Field of Classification Search
CPC ...... G01G 11/16; G01G 19/00; G01G 19/002; G01G 19/005; G01G 21/22; G01G 21/23; G01G 23/06; G01G 23/14
See application file for complete search history.

(56) References Cited

U.S. PATENT DOCUMENTS 4,553,619 A * 11/1985 Fujinaga ............ G01G 23/3707
177/1
4,742,878 A *  5/1988 Freeman .............. G01G 19/005
177/145

(Continued)

FOREIGN PATENT DOCUMENTS

EP    2 184 592 A2    5/2010
EP    2 284 504 A1    2/2011

*Primary Examiner* — Randy Gibson
(74) *Attorney, Agent, or Firm* — Schiff Hardin LLP

(57) ABSTRACT

In a dynamic scale and a weighing method therefor, an object to be weighed is received on a weighing unit of the dynamic scale and weight information of the object on the weighing unit is detected by the weighing unit. The weight information includes a number of items of weight information, which are supplied to a processor, and a derived weight value is determined in the processor by evaluation of a predetermined number of the items of weight information, and a quality value for the derived weight value is also determined in the processor by evaluation of the predetermined number of items of weight information. Depending on the quality value, it is established, in the processor, that the derived weight value is a valid weight value and, when it is established that the derived weight value is a valid weight value, the weighing unit is then fed with a new object.

15 Claims, 10 Drawing Sheets

(51) Int. Cl.
*G01G 19/414* (2006.01)
*G01G 21/23* (2006.01)
*G01G 23/06* (2006.01)
*G01G 11/16* (2006.01)
*G01G 21/22* (2006.01)
*G01G 23/14* (2006.01)

(56) References Cited

U.S. PATENT DOCUMENTS

| | | | | |
|---|---|---|---|---|
| 4,771,836 A * | 9/1988 | Naito | .................... | G01G 19/32 177/145 |
| 4,782,904 A * | 11/1988 | Brock | ................ | G01G 23/3714 177/185 |
| 5,635,679 A * | 6/1997 | Kohashi | ................ | G01G 19/035 177/1 |
| 6,559,391 B2 * | 5/2003 | Huebler | ............... | G01G 19/005 177/121 |
| 6,630,632 B2 * | 10/2003 | Huebler | ............... | G01G 19/005 177/25.15 |
| 6,635,830 B2 * | 10/2003 | Ring | .................... | G01G 11/046 177/145 |
| 6,759,602 B2 * | 7/2004 | Miller | .................. | G01G 19/005 177/1 |
| 6,825,423 B2 * | 11/2004 | Eaton | .................. | G01G 19/005 177/1 |
| 6,907,409 B1 | 6/2005 | Huebler | | |
| 6,947,912 B1 * | 9/2005 | Huebler | ............. | G01G 19/4148 177/119 |
| 7,358,450 B2 | 4/2008 | Huebler et al. | | |
| 8,698,012 B2 * | 4/2014 | Huebler | ............... | G01G 19/005 177/145 |
| 8,969,743 B2 | 3/2015 | Huebler et al. | | |
| 2001/0015291 A1 * | 8/2001 | Huebler | ............... | G01G 19/005 177/119 |
| 2002/0040260 A1 * | 4/2002 | Huebler | ............... | G01G 19/005 700/303 |
| 2006/0122950 A1 * | 6/2006 | Hubler | ................ | G01G 19/005 705/407 |
| 2009/0008859 A1 | 1/2009 | Fairweather et al. | | |
| 2009/0139777 A1 | 6/2009 | Lyga et al. | | |
| 2016/0018251 A1 * | 1/2016 | Geserich | ............... | G01G 19/005 177/25.13 |

* cited by examiner

Transport direction

Transport direction

Transport direction

Transport direction

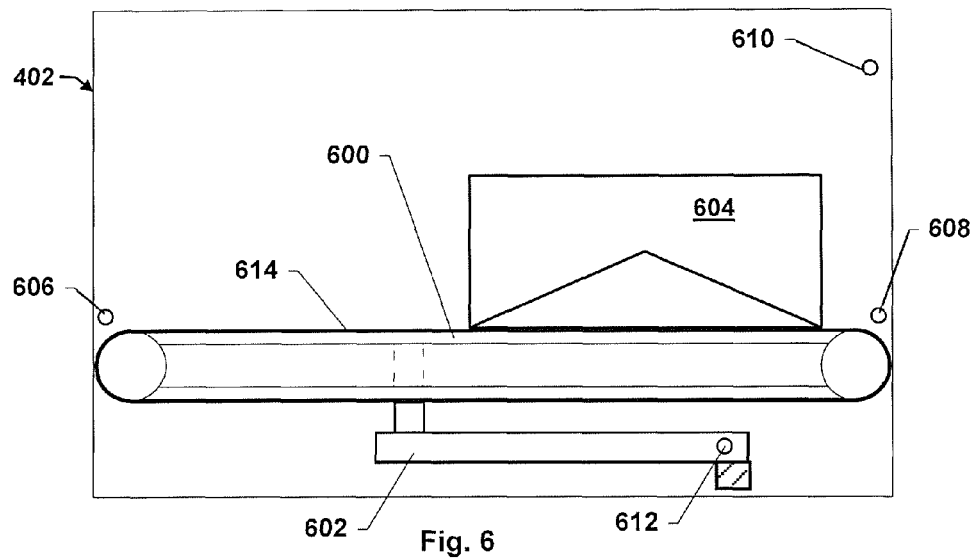
Fig. 6
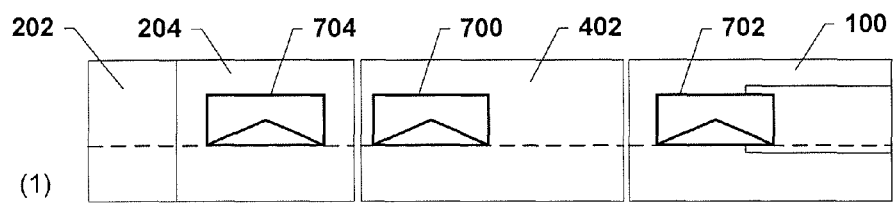
Fig. 7.1
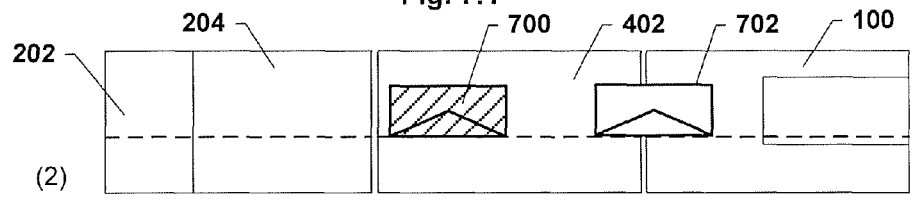
Fig. 7.2
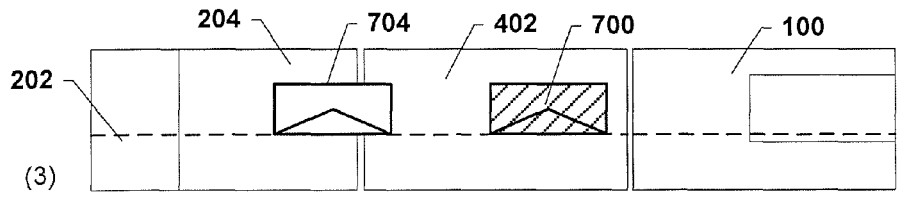
Fig. 7.3

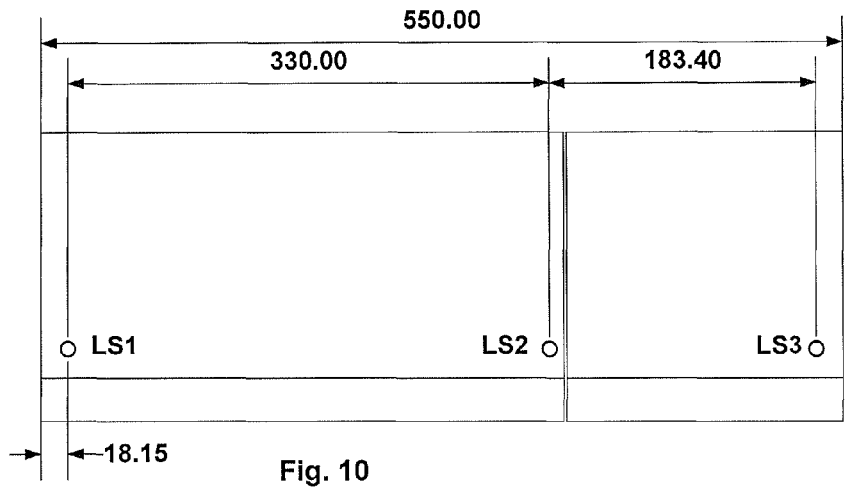
Fig. 10
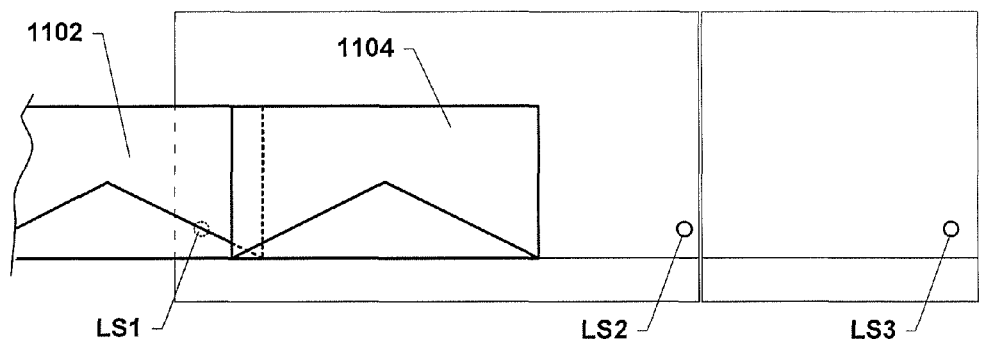
Fig. 11.1
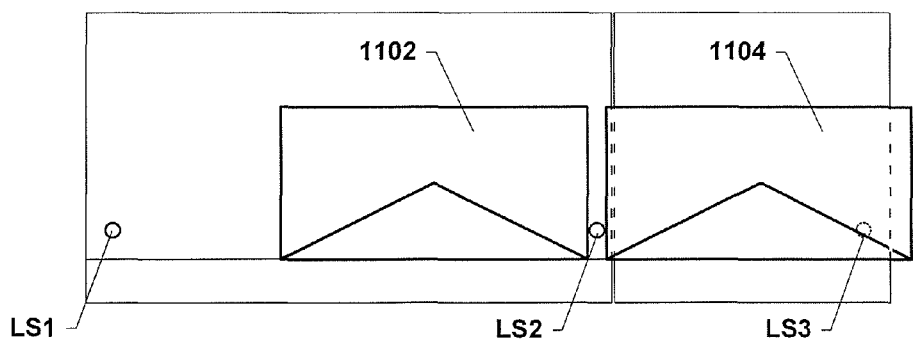
Fig. 11.2

DYNAMIC SCALE THAT USES MULTIPLE WEIGHT MEASUREMENTS OF AN OBJECT IN CONTINIOUS MOTION TO DERRIVE A WEIGHT VALUE AND A QUALITY VALUE, WHERE THE QUALITY VALUE DETERMINES THE VALIDITY OF THE WEIGHT VALUE

BACKGROUND OF THE INVENTION

Field of the Invention

The invention concerns a weighing method; an arrangement for implementation of a weighing method, and a corresponding computer-readable storage medium in the field of dynamic weighing in mail processing. A particular field of use is the determination of weights of mail pieces with the use of a dynamic scale.

Description of the Prior Art

Various solutions are known in the field of dynamic weighing in mail processing. In particular, horizontal systems or vertical systems (108°) are used.

Customer requirements are set in particular for the throughput of these systems. The throughput D of a franking machine is determined as the number of letters per time unit. With a given transport velocity v and a letter interval x (edge-to-edge, thus leading edge of a letter to leading edge of a letter), D=v/x results. This means that, in order to increase the throughput, the transport velocity of the letters must thus be increased and/or the interval between the letters must be reduced.

One criterion for the throughput is the weighing speed. For example, an algorithm to determine the weighing result is described in the Patent Document EP 1 014 052 B8. Other solution approaches to increase throughput by shortening the interval between the letters are known from the publication US 2009/0008859 A1. There, a system is described in which at least two shorter weighbars are operated in series. Short letters may be weighed with a short interval by means of one weighbar; given long letters, the weighing result is a superposition of the weighing results of both weighbars.

An additional solution is the parallel arrangement of two weighbars (described in the publication US 2009/0139777 A1) so that the throughput can be increased via parallelization of the weighing process. However, additional devices are necessary for this to divide and merge the letter stream before and after the scale, which drives up the space requirement.

Furthermore, under DE 10 2010 009 431 A1 a solution was disclosed that describes a shortened scale with a draw-off device.

A scale with cascaded weighing cells is known from the publication DE 10 2011 100 176 A1.

In tests, it has been shown that the algorithm described in EP 1 014 052 B8 is not sufficiently robust for a scale with cascaded weighing cells.

SUMMARY OF THE INVENTION

An object of the present invention to provide a weighing method; an arrangement for implementation of a weighing method and a corresponding computer-readable storage medium that remedy the cited disadvantage, and in particular provide a weighing algorithm that achieves an improved weighing precision with utilization of the principle of cascaded weighing cells.

The above object is achieved in accordance with the present invention by a weighing method for operating a dynamic scale, wherein an object to be weighed is received on a weighing unit of the dynamic scale and weight information of the object on the weighing unit is detected by the weighing unit. The weight information includes a number of items of weight information, which are supplied to a processor, and a derived weight value is determined in the processor by evaluation of a predetermined number of the items of weight information, and a quality value for the derived weight value is also determined in the processor by evaluation of the predetermined number of items of weight information. Depending on the quality value, it is established, in the processor, that the derived weight value is a valid weight value and, when it is established that the derived weight value is a valid weight value, the weighing unit is then fed with a new object.

An advantage of the present invention is that the throughput of a franking machine is increased. This is achieved by at least one weighing unit being provided in the method according to the invention, wherein the weighing unit has a weighing cell and a weighing pan. For example, the weighing unit can be a scale that is combined with a franking machine or that is part of a franking machine. The weighing unit is preferably a dynamic scale. As used herein, a dynamic scale means a scale that determines the weight of objects (weighted goods) while the object(s) moves (move) across the scale on what is known as a transport path, for example in that it (they) is (are) directed over the scale—in particular over the weighing pan—by a transport device such as a moving belt or conveyor belt, for example. The at least one weighing unit is communicatively connected with an electronic evaluation unit. According to the invention, an object to be weighted is supplied to one of the weighing units. The supply preferably takes place automatically, for example via an automatic feed. After the object to be weighed has been accepted by the weighing unit (in particular by the weighing pan), electrical signals are received by the evaluation unit in predeterminable (short) time intervals, which signals are delivered by strain gauges of the weighing cell, for example. According to one embodiment, the measurement frequency is 50 to 500 measurement values per second; in a preferred embodiment, 100 to 300 measurement values per second are provided. 200 measurement values per second has proven to be particularly advantageous. The evaluation unit calculates weight information or weight values from the electrical signals.

A derived weight value for the object is determined from a predetermined number N of items of weight information. For example, the derived weight value can be formed as a mean value of N items of weight information, preferably as a running average of N items of weight information. Moreover, a quality value is determined for the derived weight value. The quality value can be the variance or the standard deviation for the N items of weight information from which the derived weight value was formed.

According to the invention, the quality value is compared with a comparison value. The comparison value can be predetermined depending on the magnitude of the derived weight value. Depending on the result of the comparison, the associated derived weight value is defined as a valid or invalid weight value. For example, a derived weight value is defined as a valid weight value if the standard deviation or the variance of the N items of weight information from which the derived weight value was determined is less than or equal to the comparison value.

The electrical signals are preferably detected and evaluated separately for each weighing unit.

As soon as a first valid weight value is present—regardless of from which weighing unit—a new object is supplied to the weighing unit that is situated furthest upstream in terms of the flow. For example, for this it is signaled to an automatic feed that an additional object can be supplied to the at least one weighing unit.

In a preferred embodiment, the at least one weighing unit is equipped with a transport mechanism with which the objects are moved across the weighing unit. For example, the transport mechanism can be moving belts or conveyor belts. While an object is moving across the weighing unit, weight information or, respectively, weight values (from which derived weight values and the respective quality value are determined) are determined continuously at predeterminable time intervals. In order to be able to associate the weight information with an object, the at least one weighing unit is combined with a detector that detects at least: the arrival of the object at the weighing unit; the (complete) residence of the object on the weighing unit; and the beginning and end of the departure from the weighing unit by the object. For example, the detector can be formed as photoelectric barriers. At least one part of the weight information (and derived weight values) is preferably associated with object, which information is detected while the object is resident (rests) solely on the weighing pan of the weighing unit. In another preferred embodiment, that at least one part of the weight information (and derived weight values) is associated with an object, which information is detected while the object is resident (rests) entirely on the weighing pan of the weighing unit. In another preferred embodiment, at least one part of the weight information (and derived weight values) is associated with an object, which information is detected during a period of time that: begins after the object rests completely on the weighing pan of the weighing unit and a first predeterminable time period $t_1$ has additionally passed; and ends after the object no longer rests completely on the weighing pan of the weighing unit and a second predeterminable time period $t_2$ has additionally passed. It can be that $t_1=0$ and/or $t_2=0$. The event that the object rests entirely on the weighing pan of the weighing unit is preferably established in that a means for detection of the object, said means being arranged at the end of the weighing pan that is situated upstream in terms of the mail flow, detects the end of the detection of the object—a photoelectric barrier is cleared (again), for example; the event that the object no longer rests entirely on the weighing pan of the weighing unit is preferably established in that a means for detection of the object, said means being arranged at the end of the weighing pan that is situated downstream in terms of the mail flow, detects the beginning of the detection of the object—a photoelectric barrier is covered, for example. Settling and release times of the weighing unit are taken into account via such an establishment of the time period from which weight information (and derived weight values) are associated with a subject.

As noted, the subsequent object is supplied to the weighing unit after the first valid weight value has been established. Nevertheless, after this point in time weight information for the object continues to be evaluated and tested as to whether a valid weight value is present. This detection and evaluation is executed during the time periods described in the preceding paragraph. The weight of the object is determined from at least one part of the valid weight values, for example via averaging from all valid weight values associated with the object. In a preferred embodiment, valid weight values that directly follow one another—meaning that no invalid weight value is determined between the valid weight values in chronological succession—are combined into a group. According to a preferred embodiment, the weight of the object is determined solely from the most recent group of valid weight values associated with the object (since the last measured weight values are the most precise). In a further preferred embodiment of the invention, the weight of the object is determined from the k most recent valid groups of weight values associated with the object given which the quality criterion of the intervening invalid weight values does not exceed a limit value. If an invalid weight value exceeds a predetermined limit value, all previously determined valid groups are discarded.

According to a further preferred embodiment, at least two weighing units are provided, wherein the weighing cells of each of the weighing units are arranged cascaded in the direction of gravity such that the total weight of the first weighing unit (and therefore also the weight of a weighed good [sample] placed on the weighing pan of the first weighing unit) and the weight of at least one additional weighing pan of the at least one second weighing unit loads the weighing cell of the at least one second weighing unit as a preload. This applies only to the n-th weighing unit whose weighing pan is arranged last in the transport path. The associated weighing cell is connected with a floor plate of a (preferably dynamic) scale. A weighing cell of the same type can be used for all weighing cells. The weighing pan of the first weighing unit is arranged before the weighing pan of the second weighing unit as situated in the transport direction. A first sensor is preferably arranged near the start (situated upstream in terms of the mail flow) of the transport device of the weighing pan of the first weighing unit; a second sensor is preferably arranged near the end (situated downstream in terms of the mail flow) of the transport device of the weighing pan of the first weighing unit; and a third sensor is preferably arranged near the end (situated downstream in terms of the mail flow) of the transport device of the weighing pan of the second weighing unit. The at least two weighing units are communicatively connected with one another via at least one electronic evaluation unit.

According to a preferred embodiment, respective derived weight values and quality values are determined for at least two weighing units. The derived weight values and quality values are preferably determined separately for each weighing unit, meaning that they are respectively associated with the corresponding weighing unit. The evaluation of the weight information preferably takes place in parallel or pseudo-parallel. After establishing that a first valid weight value is present, a feed is signaled that a new object can be supplied to the at least two weighing units. As long as weight information can be uniquely associated with an object, this weight information continuous to be evaluated and a derived weight value and a quality value are calculated.

If derived weight values and quality values are respectively determined separately for the at least two weighing units, according to a preferred embodiment a preliminary object weight for each of the at least two weighing units is calculated from at least a portion of the valid weight values, for example in that the mean value is calculated from the portion of the valid weight values. As a result, a preliminary object weight exists for at least one weighing unit. A preferred embodiment provides that an object weight that can be used for additional processing steps (for example for a franking by a franking machine) is determined from at least a portion of the preliminary object weights, preferably from all preliminary object weights. For example, the mean value can be calculated from the portion of the preliminary object weights or, respectively, from all preliminary object weights. Alternatively, it can be provided that the object weight is determined directly from at least a portion of the valid weight values without prior determination of a preliminary object weight.

In another preferred embodiment, chronologically (directly) successive valid weight values are combined into one group $g_i$ (i=1, 3, 5, . . . ), meaning that no invalid weight value (thus a weight value with a quality value above the comparison value) is established between the weight values of a group $g_i$. According to a preferred embodiment, it is not the valid weight values from all groups that are used to calculate the object weight or the preliminary object weights, but rather only those valid weight values of a predeterminable number of groups $g_j$ (j≥3) of valid weight values. In other words: only valid weight values that have been determined from weight information that was detected after a predeterminable point in time are taken into account for the determination of the object weight or of the preliminary object weights. Valid weight values that were determined from weight information that was detected before the predeterminable point in time are not used for the determination of the object weight or of the preliminary object weights.

Derived weight values that lie between two successive groups $g_k$ and $g_{k+2}$ (k=1, 3, 5, . . . ) of valid weight values are combined into a group $g_{k+1}$ of invalid or non-stable weight values. According to a preferred embodiment, the number of groups used in the calculation of the object weight or of the preliminary object weights is determined in that the quality values of weight values of successive groups are compared. A derived quality value is preferably determined (for example via averaging) from the quality values of a group $g_k$ (k=1, 3, 5, . . . ) via determination of the maximum and/or minimum quality value from the group $g_k$. The comparison can exist in that a check is made as to whether the two quality values or derived quality values satisfy a predetermined criterion. Depending on the comparison, the number j is determined. In a preferred embodiment, a comparison of the derived quality values from two successive groups is provided for this. It has proven to be advantageous if the smallest quality value from a group $g_k$ of valid weight values is compared with the largest quality value from a group $g_{k-1}$ of non-stable weight values. According to a preferred embodiment, groups $g_1$, $g_3$, . . . , $g_{k-2}$ of valid weight values are not taken into account in the calculation of the object weight or of the preliminary object weights if the largest quality value form the group $g_{k-1}$ of non-stable weight values is greater by a predeterminable multiplier than the smallest quality value from a group $g_k$ of valid weight values. For example, the predeterminable multiple can be between two and twenty times greater; the multiple is preferably between three and ten times greater, particularly preferably between five and seven times greater. Alternatively, it can be provided that the derived quality values of groups $g_{k+1}$ (k=1, 3, 5, . . . ) of non-stable weight values are (only) assessed. For example, if the derived quality value of a group $g_{k+1}$ (k=1, 3, 5, . . . ) of non-stable weight values exceeds a predeterminable limit, the number j results as k. The comparison of the quality values of the groups preferably begins with the most recent group of valid weight values. If this comparison results that the preceding group of valid weight values is considered in the calculation of the object weight or of the preliminary object weights, this group is compared with the preceding group of non-stable weight values and so forth until a comparison results that the preceding group of valid weight values is not considered in the calculation of the object weight or of the preliminary object weights. At this point, the comparison method terminates.

The method can be applied both given scales in the described vertical design and given scales with horizontal letter transport.

The algorithm is also usable given different arrangement of the weighing cells (one weighing cell, connection of weighing cells in series).

The calculation of the measurement value groups is not absolutely necessary; the group formation with subsequent non-consideration of early measurement values leads to an additional increase of the robustness of the method.

An arrangement according to the invention has at least one chip and/or processor and is set up such that a weighing method can be executed in cooperation with at least one weighing unit, wherein
   at least one weighing unit is provided,
   an object to be weighed is accommodated on at least one of the weighing units,
   weight information is registered,
   a derived weight value and a quality value for the derived weight value are determined via evaluation of a predeterminable number of items of weight information,
   depending on the quality value it is established that the derived weight value is a valid weight value, and
   given the presence of a (first) valid weight value, the weighing unit is fed a new object.

In order to implement the method according to the invention, a computer-readable storage medium has stored program code (programming instructions) that enables a data processing device to implement a weighing method in cooperation with at least one weighing unit after the storage medium and thus the program code, has been loaded into the memory of one or more data processors. Individual modules (portions) of the programming instructions can be installed at different data processors. For an item to be weighed that has been provided to a weighing unit, the programming instructions cause the processor or processors to:
   register weight information,
   determine a derived weight value and a quality value for the derived weight value via evaluation of a predeterminable number of items of weight information,
   depending on the quality value, establish that the derived weight value is a valid weight value, and
   given the presence of a (first) valid weight value, cause a new object to ne fed to the weighing unit.

With the invention, a new weighing algorithm including workflow control is provided that—in spite of the marked increase of the throughput with utilization of the principle of cascaded weighing cells—achieves a required weighing precision (for example with the following target value: up to 250 g: +/−1 g, as of 250 g: +/−0.4%). With the method it is thus possible to operate a dynamic scale with high throughput so that the determination of weight results with the required precision can take place robustly.

The inventive weighing method, arrangement, a computer and computer-readable storage medium enable the throughput of dynamic scales (in franking machines, for example) to be increased in that the subsequent object to be weighed is already requested and supplied to the weighing unit after the presence of a first valid weight value, and enable the precision of the weight measurement to be increased in that weight information of multiple weighing units is evaluated or weight values from settling phases of the weighing unit are discarded, and enable the measurement time period or evaluation time period to be adapted to actual weight information that can be associated with an object to be weighed, for example in that weight information that is acquired when the object is only partially located on the weighing pan of the weighing unit is still used to determine the weight of the object.

BRIEF DESCRIPTION OF THE DRAWINGS

FIG. 6 is a simplified depiction of a simple dynamic scale.

FIGS. 7.1, 7.2 and 7.3 are an illustration of possible limitations in the workflow of the weight determination.

FIG. 10 is an illustration of example positions of the letter travel sensors.

FIGS. 11.1 and 11.2 are illustrations of example letter travel errors.

DESCRIPTION OF THE PREFERRED EMBODIMENTS

The invention will be explained in the following in an example of a franking machine. However, the invention is not limited to this exemplary embodiment but rather is applicable to a plurality of objects (weighed goods). In particular, each weighed good for which a weight associable with the weighed good can be determined is encompassed by the invention as well. In particular—but not so as to be limiting—the objects can be mail pieces such as letters, parcels, postcards or the like, or other objects that can be weighed individually.

Figure 1:
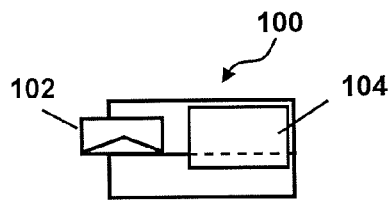
FIG. 1 is an illustration of a franking machine without peripherals.

A franking system in the simplest form is comprised of a franking machine (FM) 100 that prints franking imprints on letters, postcards or franking strips, wherein—with the exception of the strips—the letters must be manually fed by the operator via a feed 102 (see FIG. 1). The postage value to be printed is set here by the operator via a user interface 104 with keyboard and display, wherein it is supported by functions for postage calculation that are implemented in the franking machine 100. The transport velocity of the franking machine 100 is normally constant; for example, it is always 680 mm/s.

In order to be able to use the full capability of the system that can process up to 150 letters per minute, what are known as peripheral apparatuses can be connected to the franking machine 100:
automatic feed (AZ) 202
moistener/sealer (302)
dynamic scale (DS 402)
All of these apparatuses possess separate hardware (processor, memory, sensors, actuators, communication interfaces etc.) and are controlled by an apparatus-specific software. The apparatuses communicate among one another via a bus system, for example what is known as the FSCP bus (FSCP: "Franking System Control Protocol"). Conceptually, this is necessarily a bus system, meaning that every apparatus can communicate with every other; however, the system can also be designed so that each apparatus can communicate only with its immediate neighbors. If an apparatus wants to communicate with an apparatus that is not an immediate neighbor, corresponding messages must thus be relayed via immediate neighbors.

Automatic Feed

Figure 2:
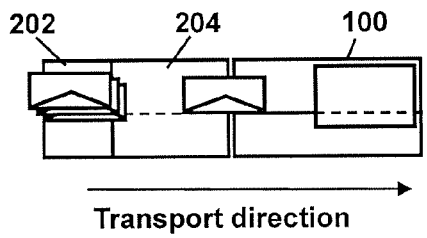
FIG. 2 is an illustration of a franking machine with automatic feed.

Every franking system that is connected with peripherals includes at least one automatic feed 202 that, at the far left, also always forms the beginning of the system (see FIG. 2). The automatic feed 202 comprises an individualization unit 204.

As given the variant without peripherals, the parameters for the franking imprint are set manually. The operator then places a stack of letters at the automatic feed 202, which individualizes the letters and supplies them individually to the franking machine 100 corresponding to the parameters for intervals and gaps that are provided by said franking machine 100. The throughput here is determined by the automatic feed 202, i.e. how well the automatic feed 202 manages to comply with the intervals in the individualization that are desired by the franking machine 100.

Moistener/Sealer (302)

Figure 3:
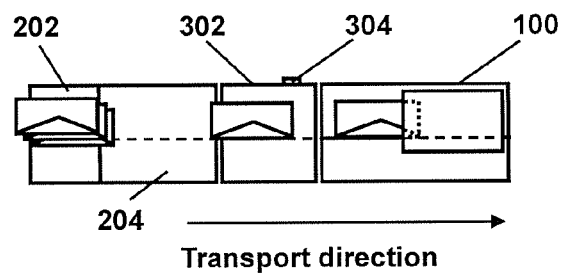
FIG. 3 is an illustration of a franking machine with automatic feed and sealer.

The sealer 302 can be added to the system as an optional peripheral apparatus to the right of the automatic feed 202 (see FIG. 3). The sealer can itself be switched from "seal" operation to "non-seal" operation via a switch 304.

In seal operation, the sealer 302 moistens the flaps of the supplied letters and presses the flaps closed. In non-seal operation, the sealer 302 forwards the letters to the franking machine 100 without sealing them.

As in the configuration without sealer 302, the letters are individualized by the automatic feed 202, wherein in seal mode the individualization parameters are provided (modified) by the sealer 302, while in non-seal mode the individualization parameters are established by the franking machine 100.

In this configuration as well, the parameters for the franking imprint must be set manually at the franking machine 100 by the operator.

Dynamic Scale 402

Figure 4:
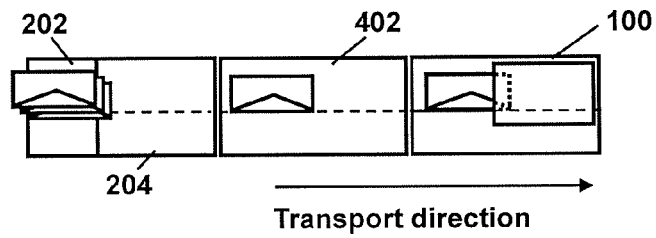
FIG. 4 is an illustration of a franking machine with automatic feed and dynamic scale.
Figure 5:
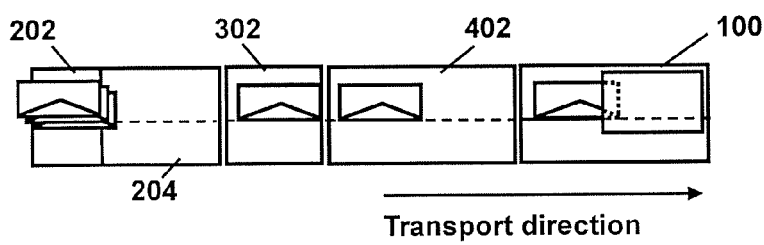
FIG. 5 is an illustration of a franking machine with automatic feed, sealer and dynamic scale.

A dynamic scale 402 can be added to the previously known combinations, wherein—according to an exemplary embodiment—the dynamic scale 402 is located immediately on the mail intake side of the franking machine 100. FIGS. 4 and 5 show the two possible combinations with a dynamic scale 402. In addition to this, alternative embodiments are possible in which (for example) the automatic feed 202 is arranged first in the transport path, then the dynamic scale 402, the sealer 302 and last the franking machine 100.

If a dynamic scale 402 is in the system, there are two modes: in the "transport only" mode, the dynamic scale 402 simply transports the letters that are supplied to it (from the respective apparatus situated to its left) further in the franking machine 100. This mode is usually chosen when the supplied letters are within the same weight and postage range and thus can be printed with the same postage value.

In the more important "dynamic postage calculation" mode, the following letter-specific parameters are determined by the system during the transport:

thickness and length—by the automatic feed 202 height and weight—by the dynamic scale 402

Given the transfer of letters from the dynamic scale 402 to the franking machine 100, these data are sent to the franking machine 100, whereupon this calculates the postage value for the respective letter and correspondingly generates the franking image.

In this mode, the throughput is determined by the dynamic scale 402. Stated in brief: only if a letter has been successfully weighed does the dynamic scale 402 actively request the feed of the next letter from the apparatus situated to its left.

Simple Dynamic Scale 402

FIG. 6 shows—extremely simplified—the design of a simple dynamic scale 402. The transport unit 600, including transport belt 614 [and] drive motor (omitted in the drawing), rests completely on the weighbar and is otherwise largely mechanically decoupled from the remainder of the system. Weighbars with strain gauges form the weighing cell 602. The weighing cell 602 is attached to a floor plate with a fixation 612. The scale is tared in the empty state and subsequently measures the weight of letters 604 resting thereupon while these are being transported. The two photoelectric barriers 606, 608 to the left and right of the transport unit define the beginning and the end of the weight measurement, because obviously the measurement can only be begun when the letter 604 rests completely on the scale, i.e. when the trailing edge of the letter 604 has cleared the intake sensor 606. Analogously, the weight determination must be terminated if the letter 604 leaves the transport unit, i.e. when the leading edge of the letter 604 occludes the exit sensor 608.

In an exemplary embodiment, the weighing electronics comprise a weighbar and an associated electronic unit that converts the analog resistance values of the strain gauges into digital values and pre-filters them. The control software of the dynamic scale 402 retrieves 100 measurement values per second from the weighing cell 602 and processes these further. (In one exemplary embodiment, the communication with the weighing cell 602 takes place via an RS232 interface.) If the determination of a weight is not achieved upon reaching the exit sensor 608—for instance because vibrations in the system generate measurement value fluctuations that are too great—the transport is halted, the letter 604 is pulled back onto the scale (meaning that the drive is in the position to transport letters 604 in the opposite direction) and a "static re-weighing" occurs with transport deactivated. It is obvious that in such a case the throughput of the system decreases, meaning that everything must be done to avoid such situations.

If a letter 604 reaches the exit sensor 608 and a valid weight value has been determined, the height sensor 610 is furthermore checked and the letter height is determined from this. Together with the parameters determined beforehand by the automatic feed (length and thickness of the letter 604), a message with al l of these dimension data is sent to the franking machine 100 and the next letter is requested from the apparatus (automatic feed or sealer) situated to the left.

Height Measurement in the Dynamic Scale 402

The height measurement is very simple and, in an exemplary embodiment, utilizes reflex photoelectric barriers (maximum 2) whose light is reflected by a foil that is glued to the opposite Plexiglas plate (at the front of the dynamic scale 402). The dynamic scale 402 thereby measures the letter height not as a continuous measurement but rather in the sense of postal height categories that result from the postal tariffs of the country in which the scale is operated.

For this purpose, up to two reflex photoelectric barriers are installed as height sensor 610 at the height(s) provided for the corresponding country. The height values belonging to this (these) height(s) are introduced into the dynamic scale 402 and stored permanently there. If the leading edge of a letter 604 reaches the exit sensor 608, the state of the height sensor 610 is queried. If it is occluded, the input height X+1 mm is set as the letter height; if it is not occluded, the height X−1 mm is set. (Analogously with two sensors with installation heights X and Y.)

The design of the exemplary system that is described above limits the letter throughput in that, in order to be able to weigh a letter, no additional letter (either predecessor or successor) may be located in the dynamic scale 402, as illustrated by FIGS. 7.1 through 7.3.

In FIG. 7.1, a situation is illustrated in which a valid measurement value for the weight of the letter 700 is detected.

In the situation illustrated by FIG. 7.2, no valid measurement value can be determined for the weight of the letter 700 since the preceding letter 702 is still situated on the scale.

FIG. 7.3 illustrates a situation in which no valid measurement value can be determined for the weight of the letter 700 because a subsequent letter 704 is already resting on the scale.

The simple dynamic scale avoids the situation depicted in FIG. 7.3 in that it always requests the next letter 704 only when the currently processed letter has reached the exit photoelectric barrier 608. It therefore results that the letters have a minimum interval (from leading edge to leading edge) that is at least equal to the interval between intake photoelectric barrier 606 and exit photoelectric barrier 608, thus approximately 520 mm. Given a transport velocity of 680 mm/s, the theoretical throughput is therefore limited to 78 letters per minute. In practice, the interval increases by at least an additional 60 mm, which arises in that the left apparatus needs some time to also execute the command to feed the next letter to the dynamic scale 402, and in that the letter itself must still travel a path distance s from the automatic feed 202 to the intake photoelectric barrier 606 of the dynamic scale 402. In reality, the simple dynamic scale therefore achieves a throughput of approximately 60 letters per minute.

Dynamic Scale 800

Figure 8:
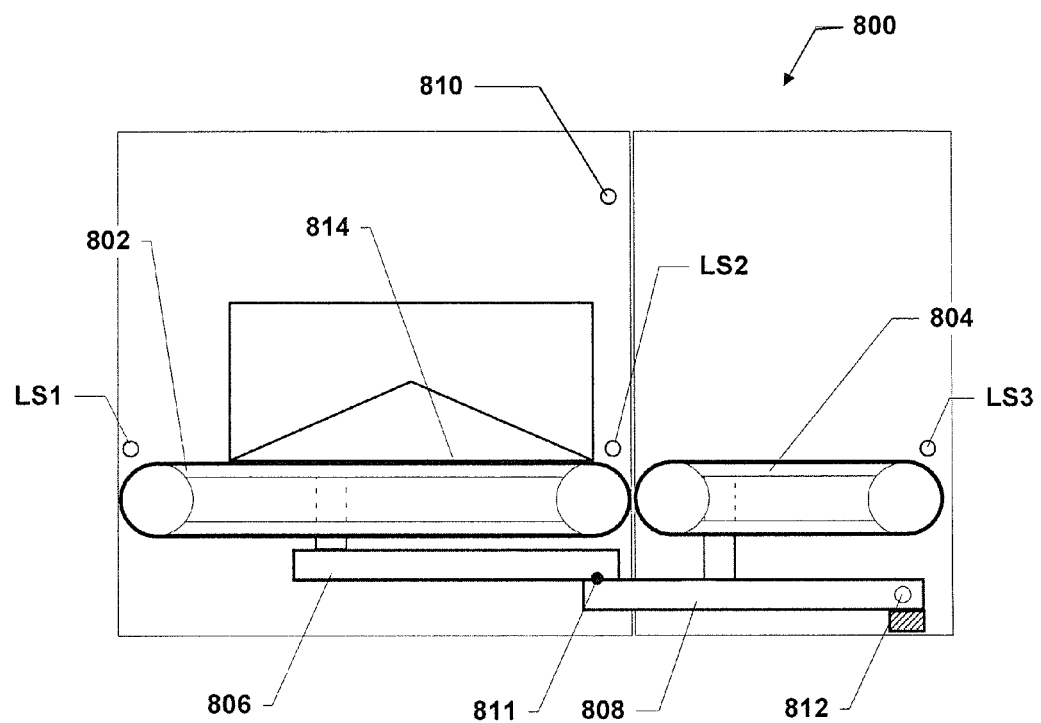
FIG. 8 is an illustration of the basic design of the weighing functions of an example of a fast dynamic scale.

The "dynamic scale" 800 according to the invention has two weighing regions 802, 804, each comprising a scale pan and a transport unit, where the two weighing regions 802, 804 are arranged sequentially. The dynamic scale according to the invention enables the throughput (i.e. the letters processed per time unit) to be increased. The dynamic scale according to the invention is faster than the simple dynamic scale, and therefore in the following it is also referred to as "Fast Dynamic Scale" (FDS). A particular advantage of the invention is that it is not necessary to change other apparatuses of the system, thus automatic feed 202, sealer 302 and franking machine 100. FIG. 8 shows—in an extreme simplification—the design of an example of a fast dynamic scale 800 with two weighing regions.

The principle is that the transport region is divided into two independently driven portions with weighing function, wherein the left region 802 is markedly longer than the right region 804. Only the left transport region 802 rests on the left weighing cell 806, in contrast to which both the left transport region 802 (including weighing cell 806) and the right transport region 804 rest on the right weighing cell 808 at a connection point 811. The right weighing cell 808 is attached to a floor plate with a fixation 812. Both weighing cells 806, 808 are otherwise mechanically decoupled from the remainder of the apparatus. FIG. 9 shows how—after both weighing cells 806, 808 have been tared in the downtime—weights resting thereupon are measured.

Figure 9A:
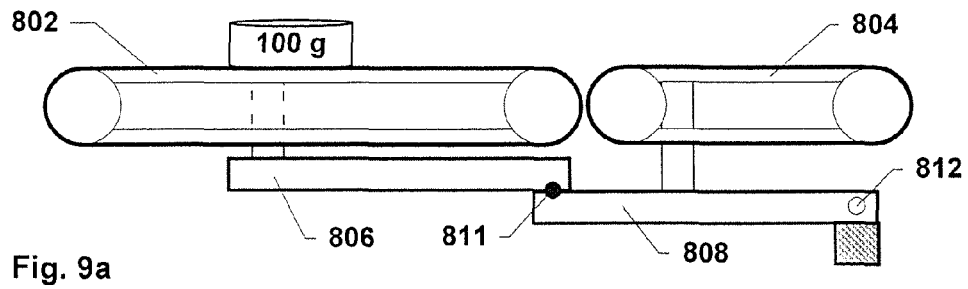
FIGS. 9a-9d are illustrations of the principle of the weight determination with two weighing cells.

According to FIG. 9*a* a letter with a weight of 100 g has an impact on the first weighing cell 806, where the first weighing cell 806 measures a weight of 100 g. The weight of the letter, of the mechanics of the transport region 802 and of the first weighing cell 806 is transferred, via the connecting point 811, to the second weighing cell 808, which is calibrated and tared in such a way that also a weight of 100 g is measured.

Figure 9B:
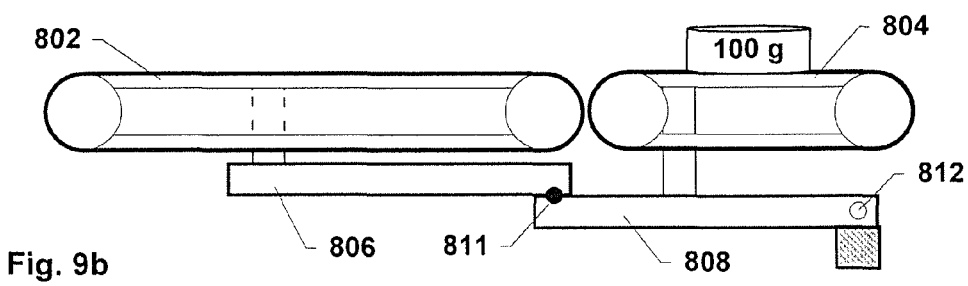

According to FIG. 9*b* no letter, i.e. a weight of 0 g, has an impact on the first weighing cell 806, but a letter of a weight of 100 g has an impact on the second weighing cell 808. The weight of the letter and, via the connecting point 811, also the weight of the mechanics of the transport region 802 and of the first weighing cell 806 have all an impact on the second weighing cell 808, which is calibrated and tared in such a way that also a weight of 100 g is measured.

Figure 9C:
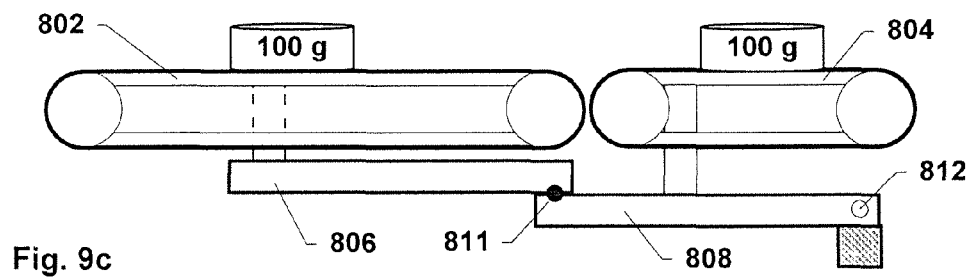

According to FIG. 9*c* a letter with a weight of 100 g has an impact on the first weighing cell 806, where the first weighing cell 806 measures a weight of 100 g. According to FIG. 9*c* a further letter with a weight of 100 g has an impact on the second weighing cell 808. In addition to the weight of the letter on the second weighing cell 808 the weight of the mechanics of the transport region 802, of the first weighing cell 806 and of the letter, which has an impact on the first weighing cell 806, is transferred, via the connecting point 811, to the second weighing cell 808, which is calibrated and tared in such a way that in this case a weight of 200 g is measured.

Figure 9D:
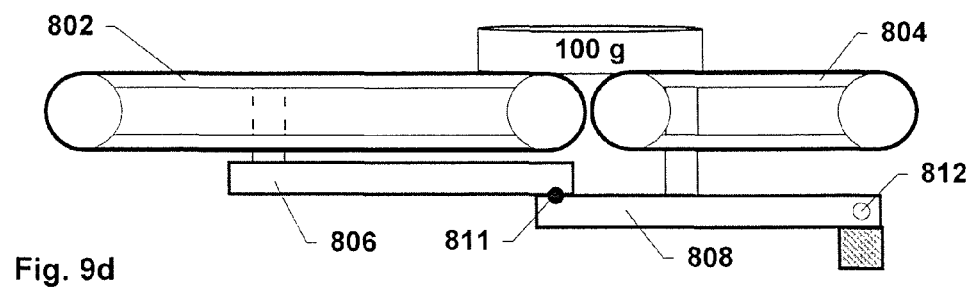
Figure 12:
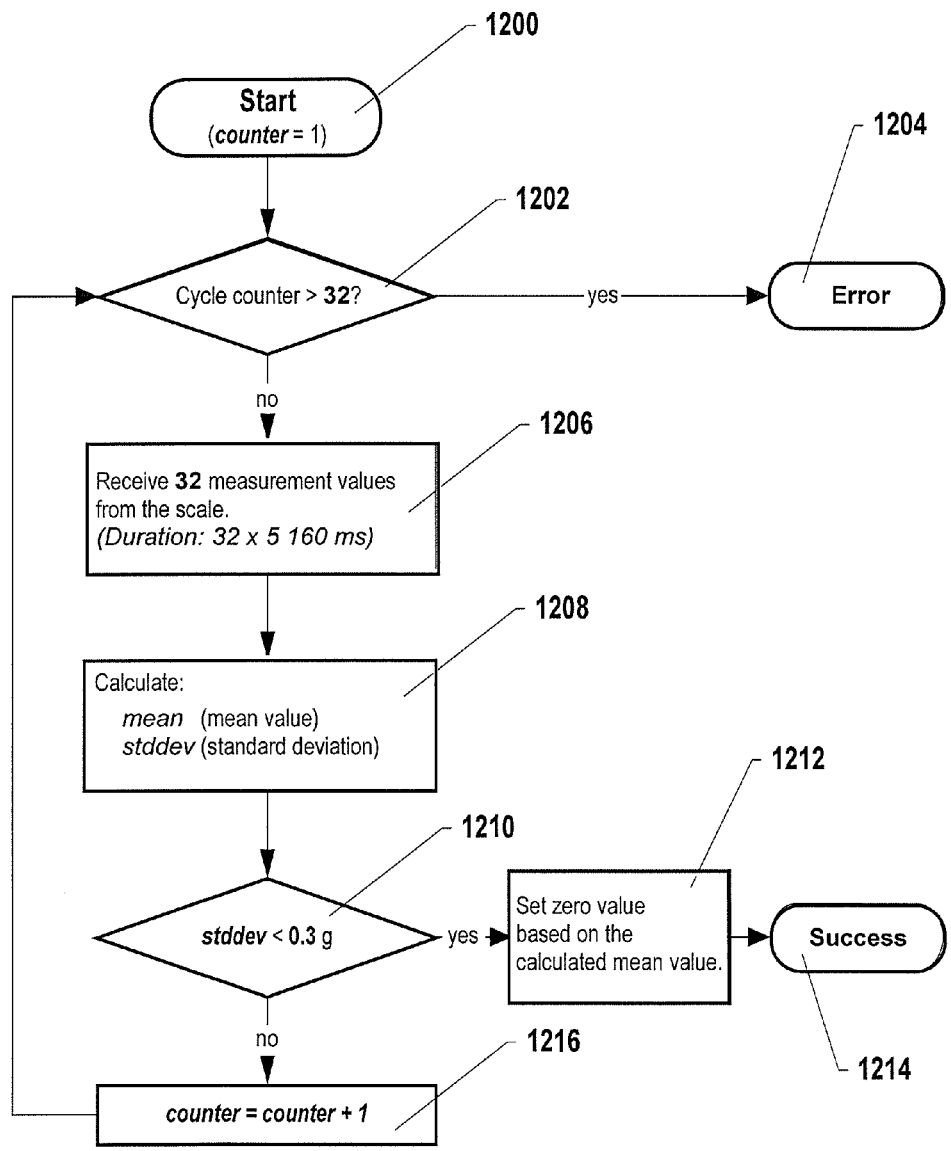
FIG. 12 is a flowchart to illustrate an example of taring.

According to FIG. 9*d* a letter with a weight of less than 100 g has an impact on the first weighing cell 806, since the letter has in part left the scale. Thus, by the first weighing cell 806 an undefined first part of the weight of the letter is measured, which cannot be used. However, the second weighing cell 808 can measure the entire weight of the letter. The first undefined part of the weight of the letter, the weight of the mechanics of the transport region 802 and of the first weighing cell 806 is transferred, via the connecting point 811, to the second weighing cell 808. Further, a second undefined part of the weight of the letter is transferred directly to the second weighing cell 808, which is calibrated and tared in such a way that both undefined parts of the weight of the letter are measured together as a weight of 100 g.

With this principle, the limitation of the simple system that is shown in FIG. 7.3 is nullified. The left region 802 of the fast dynamic scale 800 is so long that the weight of letters of standard size (i.e. C6 length for Europe and US #10 in the USA) and shorter can already be determined in this region 802. Letters that are longer than the first weighing region 802 must naturally be weighed using the right weighing cell 808. Due to effects (for example settling phases of the weighing unit), the length of the letters that can be weighed on the first weighing region 802 is somewhat shorter. If the weight for a letter can already be determined at the left weighing cell 806, the next letter can then also be immediately requested. A theoretical letter interval for standard letter formats (leading edge to leading edge) that is identical to the length of the left region (330 mm, for example) therefore results. With the aforementioned delay (approximately 60 mm) of the feed of the following letter by the left neighbor, a total interval of 390 mm then results which corresponds to a throughput of approximately 104 letters per minute given the transport velocity of 680 mm/s. In practice, however, this throughput is achieved only for very short formats.

According to an exemplarily embodiment, new object (for example mail items, letters) are supplied to the dynamic scale if pre-defined conditions are satisfied, and that after grouping of measurement values an evaluation is performed by the micro-processor for deciding, which measurement value can put out as a valid value.

Letter Transport

The two transport regions 802, 804 are driven with identical direct current motors, wherein the motor power can be adjusted via PWM (pulse width modulation). Moreover, the rotation direction of the motors can be changed, for instance in order to "retrieve" a letter for static re-weighing. An encoder wheel is attached to both motors, the clock pulses of which encoder wheel are relayed from a field programmable gate array (FPGA) per interrupts (IRQs) to the processor. According to an exemplary embodiment, the resolution of the encoder (identical for both drives) is approximately 258 µm, and therefore is sufficiently precise.

With the aid of the encoder, the software (SW) of the fast dynamic scale 800 respectively implements a PID control (PID=Proportional-Integral-Derivative) for the speed of both drives. A higher or lower system velocity than the standard velocity (of 680 mm/s, for example) is to be set in order to counteract a drop in the velocity (for instance if a heavy letter arrives) on the one hand, or in certain situations (see below) on the other hand.

Three photoelectric barriers LS1, LS2, LS3 are also present that enable letters in the system to be detected (leading edges or, respectively, trailing edges). As FIG. 8 shows, the first photoelectric barrier LS1 is located immediately at the beginning of the left transport unit 802, the left photoelectric barrier LS2 is located at the end of the left transport unit 802, and the third photoelectric barrier LS3 is located at the end of right transport unit 804 (thus at the end of the fast dynamic scale 800).

Within the scope of the letter transport, two tasks are taken on by the SW:

letter travel monitoring (error detection)

execution of position-dependent processing steps

Letter Travel Monitoring

With the aid of the photoelectric barriers LS1, LS2, LS3 and the encoder, the software of the fast dynamic scale 800 implements a position-dependent letter travel monitoring. For example, this takes place as follows: in that encoder clock pulses can be converted into paths, the positions of the photoelectric barriers LS1, LS2, LS3 are known, and it can be assumed that the letter movement correlates with the encoder clock pulse except for a permissible mechanical slippage, letter jams (for example) are detected in that a photoelectric barrier LS1, LS2, LS3 has not been closed or opened by a letter although the letter would have needed to have moved accordingly.

Example: if a letter has completely entered into the fast dynamic scale 800, the sensor LS1 is thereby cleared. If the letter is now transported 330 mm further, it would have had to also clear the sensor LS2. With an allowed slippage of 50%, it results from this that the event "LS2 open" has been observed after 1.5*330/0.257989=1918 encoder clock pulses. Otherwise, a letter jam is assumed and the system is stopped.

An additional cause of error that is detected by the SW is what are known as letter travel errors, often caused by individualization errors in the automatic feed. FIG. 11 shows one example. In the situation 11.1, two non-individualized letters 1102, 1103 enter into the fast dynamic scale 800. They are visible as a single letter at the photoelectric barrier LS1. In the fast dynamic scale 800, the letters 1102, 1104 separate and a gap is detected at the photoelectric barrier LS2. This leads to a contradiction that the SW recognizes, and a letter travel error is detected.

Given both letter jams and letter travel errors, the system stops and sends a corresponding status message to the franking machine 100, which then starts the automatic letter jam remediation with the aid of the operator.

Letter Handling

The letter travel monitoring can also trigger position-dependent processing steps, for instance: "If the leading edge of a letter is located 50 mm after LS2 and there is still no valid weight value, reduce the velocity to 300 mm/s!" Additional examples of this are cited in the following.

According to the previously described exemplary embodiment, it is thus provided that position determinations are based only on the photoelectric barrier events and the encoder signals, and not on time measurements that are converted into paths with the aid of velocity measurements.

The weight determination in the fast dynamic scale 800 is explained in greater detail in the following.

Weighing Electronics

According to an exemplary embodiment, the two scales are respectively comprised of a weighing cell (weighbars with strain gauges) and an evaluation electronic unit connected to this. Both scales are preferably completely electronically identical.

The SW communicates with the evaluation electronics via RS232; both scales are respectively connected to a universal asynchronous receiver/transmitter (UART) of the processor. ASCII-based commands are thereby sent to the scale which, for its part, sends ASCII-based responses, with one exception: in the "continuous measurement value detection" mode, the scales continuously send measurement values in binary format until this mode is abandoned.

According to one exemplary embodiment, the communication with the scales occurs in (pseudo-)parallel in that a separate communication task is started for each scale; a superordinate task coordinates the two tasks.

Configuration of the Scales

The scales must be configured before use, for example the baud rate for the communication, the format for (weight) measurement values etc. Various embodiments provide to store this configuration in an EEPROM of the weighing electronics, from where it is then automatically adopted upon each reset. The example of a fast dynamic scale 800 does not use this mechanism, meaning that—instead of relying on correct stored parameters—the SW newly sets all relevant parameters upon start of the system (the time for this is negligible).

Single exception: the parameters of "characteristic line" are stored in EEPROM upon calibration.

Examples of important fundamental operating parameters are indicated in the following Table 1:

TABLE 1

| Parameter | Value |
|---|---|
| Baud rate | 38400 bit/s |
| "Internal Conversion Rate" ICR and "High Speed Mode" HSM for continuous measurement value detection | 200 measurement values/s |
| "Nominal Value" NOV (resolution of the user characteristic line) | Resolution of the measurement values 1/10 g. |

The example scale also offers the possibility to activate a chain of digital filters. The following filter settings indicated in the following Table 2 have proven to be advantageous:

TABLE 2

| Designation | Explanation |
|---|---|
| "Filter Mode": FMD4 | Fast transient digital filter (FIR low-pass filter, settling time < 160 ms) |
| "Amplifier Signal Filter": ASF6 | Determines the limit frequency of the filter, here according to manual: 8 Hz. |
| "Comb Filter" (notch filter): NTF | Two frequencies are filtered per comb filter: 9 Hz and 18 Hz. |

According to an exemplary embodiment, these filter settings are identical for both scales and used for all measurement value detections, even during taring. In individual cases, it has proven to be advantageous if other settings are used in the calibration.

Taring of the Scales (Zero Point Determination)

In the "dynamic weighing" mode, both scales are tared before every start of the fast dynamic scale 800. During this process, the entire system is at a standstill. Only if the taring has concluded successfully does the fast dynamic scale 800 signal its operational readiness, whereupon the franking machine starts the system with an additional command.

Upon taring, a self-defined standstill condition is monitored and the zero point is reset. Here the method for both scales is also identical and runs in (pseudo-)parallel.

Upon start 1200, a counter is set to one. In a next step 1202, a check is made as to whether the counter exceeds a predetermined value (example 32). In the event that this check turns out to be positive, in step 1204 an error message is sent to the franking machine.

If the check in step 1202 turns out to be negative—meaning that the counter value is less than or equal to 32—in step 1206 a measurement is executed in which measurement values are received from the scale. A preferred embodiment provides to receive 32 measurement values at intervals of 5 ms, which leads to a duration of the measurement of 155 ms. The filters are preferably active during the acquisition of the measurement values.

In a subsequent step 1208, the mean value (mean) and the standard deviation (stddev) of the measurement values are calculated.

In a subsequent step 1210, a check is made as to whether the standard deviation falls below a predetermined value. If this is the case, in a step 1212 the zero value is assumed as the calculated mean value, and in a step 1214 the successful end of the taring is signaled.

If the check in step 1210 turns out to be negative, in a step 1216 the counter is increased by a value and the algorithm returns to step 1202.

Data Acquisition

With laboratory tools, the behavior of the fast dynamic scale 800 is recording during the weighing process and visualized by means of measurement value curves (traces).

Figure 13:
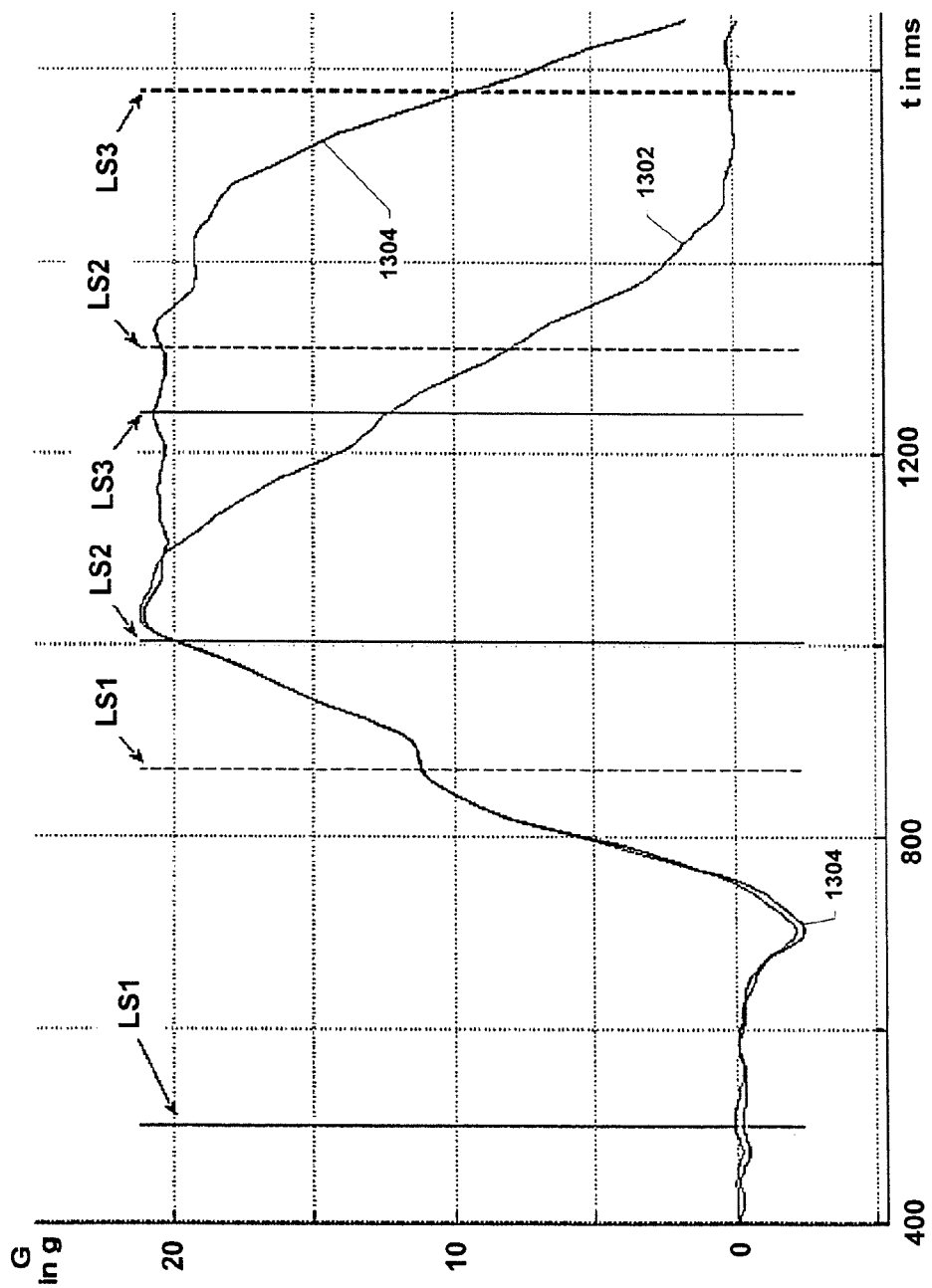
FIG. 13 shows an example of visualization of a measurement value curve of a US #10 letter weighing approximately 20 g.

Therefore, a corresponding tool has been developed that on the one hand visualizes the measurement data and photoelectric barrier events, but moreover also serves to implement real analyses (state of the algorithm) or, respectively, what if?-analyses (influence of modified parameters of the weighing algorithms). FIG. 13 shows as an example the visualized measurement value curve of a US #10 letter of approximately 20 g in weight.

The curve of the measurement values of the left scale is depicted in a first measurement value curve 1302; the curve of the measurement values of the right scale is depicted in a second measurement value curve 1304. The photoelectric barrier events (close/open) are apparent as vertical lines; a solid line stands for "sensor is occluded" (close), a dashed line stands for "sensor is clear" (open).

Algorithm for Dynamic Weight Determination
Stability Criterion

The basis of the algorithm is the observation that the measurement results from the scale are stable if the standard deviation of a sequence of N successive measurement values is "small". According to a preferred embodiment, in the fast dynamic scale 800 the standard deviation is defined as a square root of the variance, meaning that $$\text{var}:=1/n\Sigma_{i=1}^{n}(\bar{x}-x_1)^2 \text{ and stddev}=\sqrt[2]{\text{var}}$$

In a preferred embodiment, the value 10 is selected for the window size N. Contrarily, the allowed standard deviation is preferably dependent on the mean value (mean) of the 10 measurement values and, for example, is calculated according to the following scheme:

1. calculate test=0.015*mean (meaning 1.5% of the mean weight)
2. real test<0.3:test:=0.3 (lower limit)
3. real test>1.5:test:=1.5 (upper limit)

Steps 2 and 3 have the effect that the test is not too strict for light letters (less than 20 g) or, respectively, is not too lenient for heavy letters (more than 100 g).

During the measurement time period for a letter (time period in which the measurement values from a scale can generally be reasonably associated with the letter—definition follows further below), with every arriving measurement value the mean value is thus calculated over the last 10 measurement values and the standard deviation of the values is calculated. If the standard deviation satisfies the aforementioned criterion for the allowed standard deviation (meaning that stddev<= test), the mean value of the series is considered to be a stable measurement result. In a preferred embodiment, it is provided that only the variance is considered in the calculation in the SW implementation—the extraction of the square root (for calculation of the standard deviation) is omitted for performance reasons.

The averaging and testing for both scales preferably take place separately.

As soon as a valid measurement result is present, the feed of the next letter from the left neighbor is requested. Exceptions and additional boundary conditions are explained in the following sections.

Establishment of the Measurement Time Period

What is meant by the measurement time periods are the time periods in which a letter is located on one of the scales so that the scale actually measures the entire weight of the letter.

The principles are (at least in theory) simple:
The measurement is begun as soon as the letter rests entirely and individually on the scale (meaning that no additional letter rests on the scale).
The measurement is ended as soon as the letter leaves the scale (meaning that the letter still rests only partially on the scale) or an additional letter travels onto the scale.

In practice, numerous tests have shown that it is necessary to modify the time periods due to the settling times of the filter chain of the weighing electronics. In a few words: even if a letter has completely traveled onto the scale, the evaluation of the measurement values must still wait a certain amount of time. Conversely, measurement values can still be associated with a letter for a while, even if it has already in part left the scale. However, the principle of ending the measurement if an additional letter travels onto the scale is always complied with. The measurement is also not begun before a possible predecessor letter has left the scale.

The rule, "If a stable measurement result exists, the next letter is requested" has one exception: if a stable measurement result is already measured very early at the left scale 806, the request for the next letter is possibly delayed until the situation will be avoided that the following letter already entirely rests on the scale while the currently measured letter has not yet left said scale. Nevertheless, if this occurs, the fast dynamic scale 800 generates a corresponding error message and ends the letter processing.

The following delay times indicated in the following table 3 were thus established:

TABLE 3

|  | Beginning | End |
| --- | --- | --- |
| Left scale | 50 ms after LS1 open (Letter rests entirely on scale) | 50 ms after LS2 close (Letter leaves the scale) |
| Right scale | 100 ms after LS1 open (Letter rests entirely on scale) or, respectively, 100 ms after LS3 open (Preceding letter has left the scale) | 100 ms after LS3 close (Letter leaves the scale) or, respectively, immediately with LS1 close (Following letter arrives) |

Figure 14:
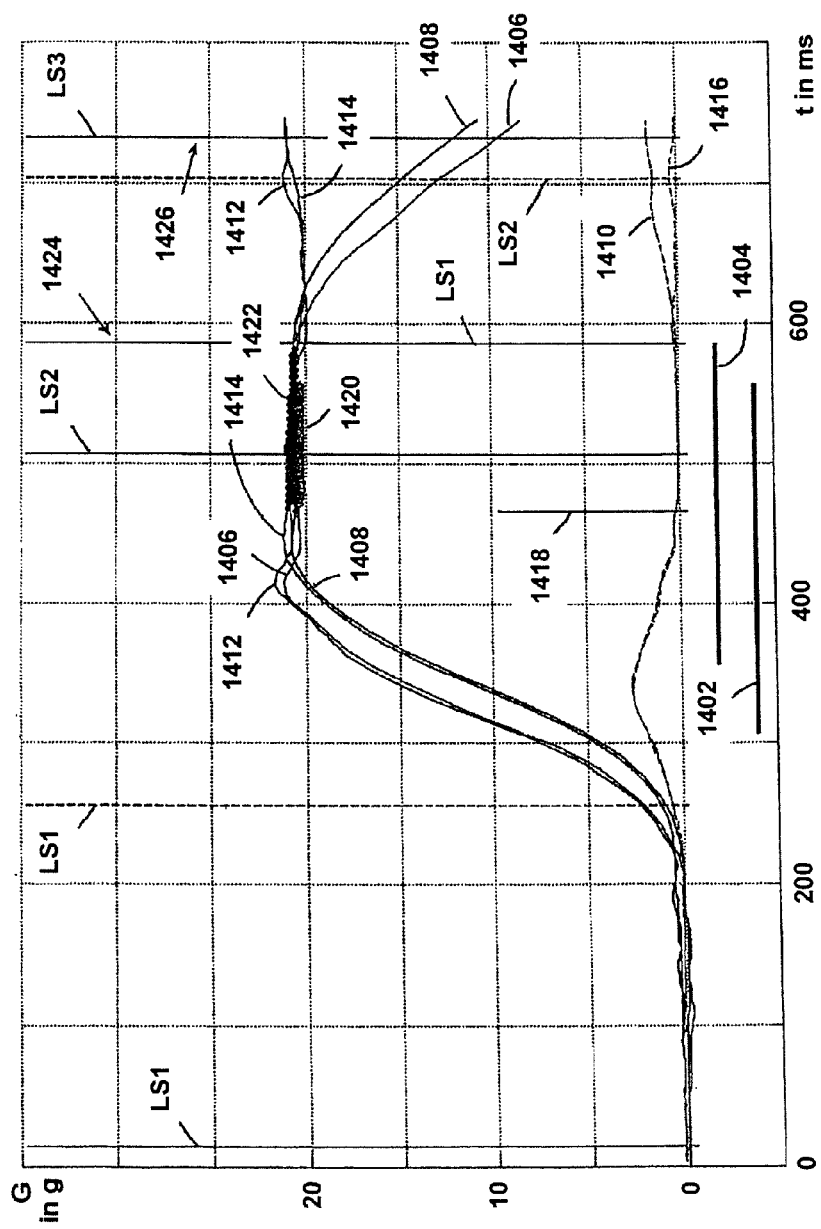
FIG. 14 shows an example of a visualization of a measurement value curve of a first C6 letter of a series (approximately 20 g).
Figure 15:
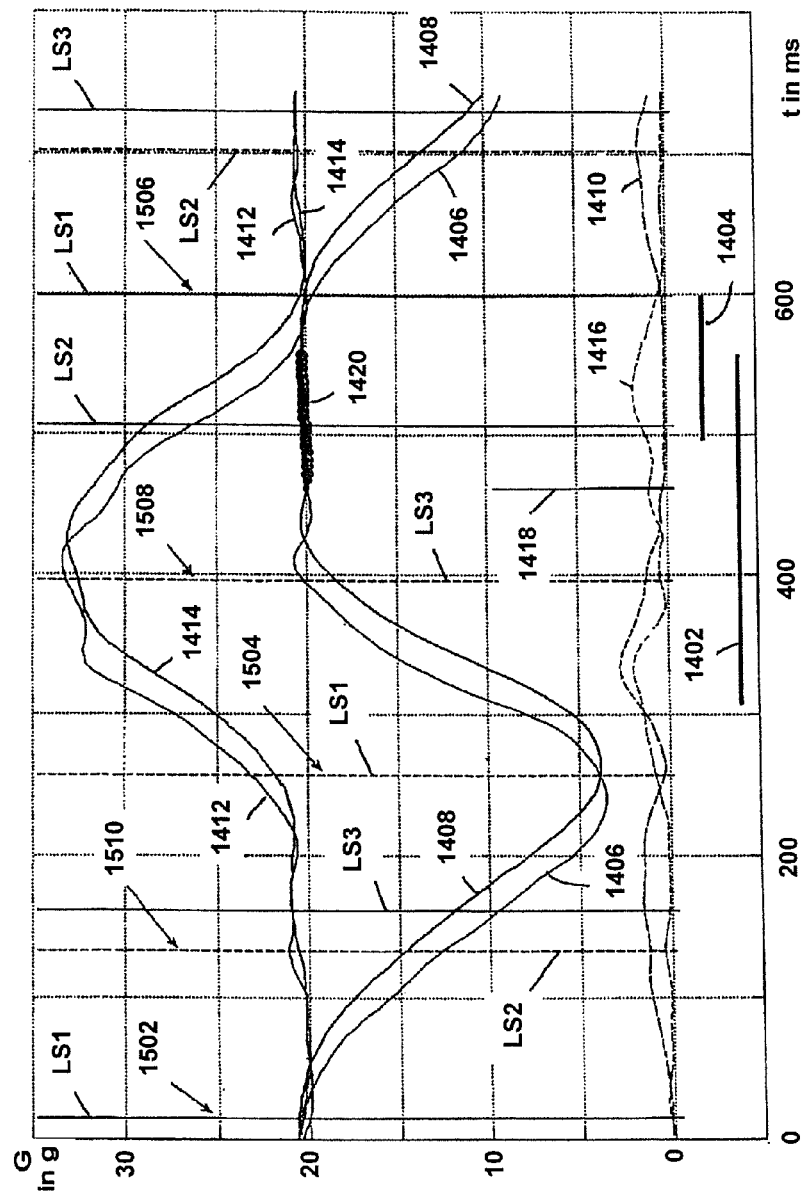
FIG. 15 shows an example of a visualization of a measurement value curve of a second C6 letter of a series (approximately 20 g).

The measurement value curves reproduced in FIGS. 14 and 15, in which the measurement time periods are depicted as horizontal bars, should illustrate the discussion.

The following Table 4 serves as a legend for FIGS. 14 and 15:

TABLE 4

| Horizontal bars | |
| --- | --- |
| Reference character 1402 | Time period in which measurement values of the left scale 806 are processed |
| Reference character 1404 | Time period in which measurement values of the right scale 808 are processed |
| Curves | |
| Reference character 1406 | Measurement values of the left scale 806 |
| Reference character 1408 | Mean value of the last 10 measurement values of the left scale 806 |
| Reference character 1410 (in the lower part of the diagram) | Standard deviation of the last 10 values of the left scale 806 |
| Reference character 1412 | Measurement values of the right scale 808 |
| Reference character 1414 | Mean value of the last 10 measurement values of the right scale 808 |
| Reference character 1416 | Standard deviation of the last 10 values of the right scale 808 |
| Vertical lines | |
| LS1 | Intake photoelectric barrier 606 (solid: intake photoelectric barrier 606 is occluded, dashed: intake photoelectric barrier 606 is clear) |

TABLE 4-continued

| | |
|---|---|
| LS2 | Photoelectric barrier LS2 at the end of the left transport unit 802 (solid: photoelectric barrier LS2 is occluded, dashed: photoelectric barrier LS2 is clear) |
| LS3 | Exit photoelectric barrier 608 (solid: exit photoelectric barrier 608 is occluded, dashed: exit photoelectric barrier 608 is clear) |
| Reference character 1418 | Point in time at which the next letter has been requested from the automatic feed 202 |

Circles

| | |
|---|---|
| Reference character 1420 | Mean values of the 10 last measurement values from the left scale 806 that represent stable measurement values according to the stability criterion defined above |
| Reference character 1422 | Mean values of the 10 last measurement values from the right scale 808 that represent stable measurement values according to the stability criterion defined above |

In FIG. 14 it is well apparent that, although the letter rests entirely on the scale at 256 ms, it still takes some time until the measurement values reach the expected 20 g, namely only at 391 ms. This corresponds to a "settling time" of approximately 140 ms. 10 measurement values of the left scale 806 that form a "stable measurement result" in the sense of the aforementioned stability criterion are present for the first time at 466 ms, if the right scale 808 then also delivers such values. At 586 ms, the following letter travels enters into the fast dynamic scale 800 (event 1424), whereupon the measurement is ended. The evaluation of the measurement values from the left cell 806 ends earlier according to the specification, namely after the letter has left the left scale 806 (LS2 close at 507 ms). At approximately 732 ms, the letter reaches the exit photoelectric barrier LS3 (event 1426).

FIG. 15 shows the measurement value curve of the following letter. Here the slow unloading of the left scale 806 is well apparent, although the letter enters as of 15 ms (event 1502) and rests entirely on the scale at 257 ms (event 1504). Only at 393 ms does the left scale 806 deliver a measurement value of 20 g (event 1508); the delay is in turn at approximately 140 ms. The left scale 806 delivers stable measurement results as of 462 ms, up to the end of the measurement time period (horizontal bar 1418). Due to the fact that the following letter is already requested with the first stable measurement result (which following letter arrives in the fast dynamic scale 800 at 599 ms), this time there are no stable measurement results from the right scale 808. It is also visible that the measurement time period for the right scale 808 only begins at 496 ms, i.e. 50 ms after the predecessor letter has completely left the scale (event 1510). The measurement time period for the right scale 808 ends with the arrival of the following letter (599 ms) (event 1506).

The Weight Calculation Algorithm

After it has been explained in the preceding segments according to which criterion a stable measurement result is derived from a series of measurement values, and when measurement values are processed in such a manner at all, it is now explained how the weight value is determined that is transferred—together with the remaining dimensions of the letter—to the franking machine.

As explained above, what is known as the measurement time period defines the time period in which measurement values from a scale are processed at all. In order to test series of measurement values according to the aforementioned "good" (i.e. stable) quality criterion, according to this exemplary embodiment at least 10 successive measurement values are required from this time period. Given a measurement frequency of 200 Hz, this means that a "stable measurement result" can exist at the earliest 50 ms after the beginning of the measurement time period.

As is apparent in FIG. 14, there are often multiple stable measurement results from a scale. In this example, there are even multiple stable measurement results from both scales. The calculation of the weight value for the letter from these values now takes place according to the following algorithm:

1. Calculate the mean value of all stable measurement results of the left scale: $mean_{left}$.
2. Calculate the mean value of all stable measurement results of the right scale: $mean_{right}$.
3. Result: mean value of $mean_{left}$ and $mean_{right}$.

If only one of the two scales at all delivers stable measurement values, the last step is omitted. In comprehensive tests it has been verified that this algorithm yields the best results if a plurality of stable measurement results exist.

Figure 16:
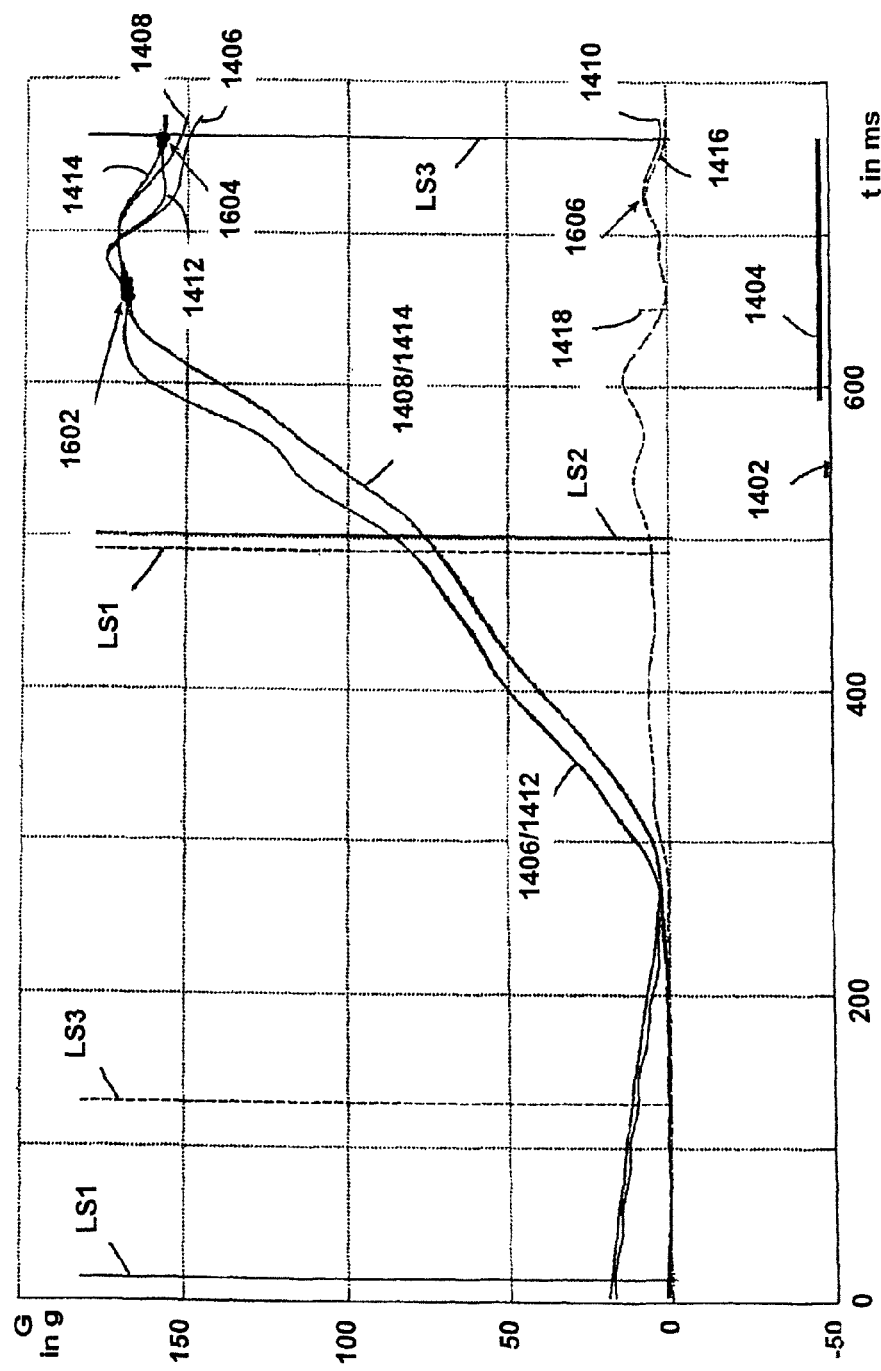
FIG. 16 is an illustration of groups of valid (stable) weight values given throughput of a letter with a weight of 158.2 g.

The measurement value curve upon throughput of a letter with a weight of 158.2 g is reproduced in FIG. 16. It is visible that, as of 652 ms, the left scale delivers stable measurement results (1602) but after this the measurement results are no longer stable for some time (up to 757 ms), whereupon a group of stable measurement results follows again (1604). In the gap between the two groups, the standard deviation for 10 successive measurement values from the scale increases up to 6.64 (event 1606), while the smallest standard deviation in the second group of stable values is only 0.47 g. The algorithm in its simple form (see above) here yields a value of 165.5 g, which corresponds to a deviation of 7.4 g from the desired value. Therefore, in such cases the algorithm will proceed somewhat differently.

If there are multiple groups of stable measurement results (i.e. if a group of non-stable measurement results lies between stable measurement results), thus groups $g_1$, $g_2$, ..., $g_n$, wherein $g_1$ is the first (oldest) group of stable measurement results, followed by $g_2$, a group of non-stable measurement results etc. up to a last (most recent) group $g_n$ with stable measurement values, the algorithm proceeds as follows: the stable measurement results across which the mean value is ultimately calculated are selected in that, beginning from $g_n$ (most recent group of stable measurement results), the standard deviation of the predecessor group $g_{n-1}$ (group of non-stable measurement results) is examined. If, for a group $g_k$ of stable measurement results, the maximum standard deviation in the group $g_{k-1}$ of non-stable measurement results is 5 times greater than the minimum standard deviation in the group $g_k$, all stable measurement results lying before the group $g_{k-1}$ are no longer used for the final measurement value calculation.

In the example in FIG. 16, this means that the measurement results of the first group are no longer used for mean value calculation, which leads to a result of 158.1. The deviation from the desired value is therefore only 0.1 g.

Static (Re-)Weighing

If it is not possible to determine the weight of a letter dynamically (i.e. during the transport), the letter is re-weighed statically. That a letter could not be weighed dynamically is established if the letter closes LS3. If no single, stable measurement result in the sense of the algorithms illustrated above then exists, the transport is stopped and the letter is transported back to the scale. The drives of the fast dynamic scale 800 are then deactivated (the drives of the left neighbors are not active anyway in such a case); only the franking machine continues to run.

After a wait time of 100 ms, running measurement values are queried from the right scale 808 and evaluated with the stability criterion defined above. However, the window size is now 50 (measurement values) instead of only 10 in the dynamic case. If a series of 50 measurement values then satisfies the stability criterion, the mean value is used as a weight and the letter processing is started again in dynamic mode. This means that a next letter is requested and the current letter is passed to the franking machine.

If this does not lead to success within 5 seconds, a corresponding message is sent to the franking machine.

Determination of the Letter Height in the CFDS

The determination of the letter height takes place exactly as in the simple DS (see above); only the x-position of the height sensors 610 is modified. These are now located at the end of the left scale 806, such that the query 610 can already take place when the letter occludes LS2.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for operating a dynamic scale, comprising:
   continuously transporting an object to be weighed on a weighing unit of a dynamic scale without stoppage of said object on said weighing unit;
   with said weighing unit, detecting weight information for the object on the weighing unit, by performing a plurality of weight measurements of said object information;
   providing said plurality of weight measurements to a processor and, in said processor, automatically selecting a predetermined number of said weight measurements and determining a derived weight value, and a quality value for said derived weight value;
   in said processor, using said quality value to determine whether said derived weight value is a valid weight value for said object; and
   if it is determined in said processor that said derived weight value is a valid weight value for said object, providing a signal from said processor that allows a new object to be continuously transported on the weighing unit.

2. A method as claimed in claim 1 comprising deriving a plurality of derived weight values, and for each weight value also deriving a quality value, for said object while said object is on said weighing unit.

3. A method as claimed in claim 2 comprising determining, in said processor, an object weight for said object from at least some of said valid weight values.

4. A method as claimed in claim 1 wherein said weighing unit is a first weighing unit, and wherein said method comprises:
   also providing said dynamic scale with a second weighing unit, each of said first weighing unit comprising a weighing pan and a weighing cell;
   continuously transporting said object in a transport direction in said dynamic scale and arranging said weighing units in said dynamic scale with the weighing pan of said second weighing unit following the weighing pan of said first weighing unit in said transport direction, and with the respective weighing cells of the first and second weighing units being cascaded in the direction of gravity, with a total weight, comprising a weight of said first weighing unit and a weight of the weighing pan of said second weighing unit, loading the second weighing unit as a pre-load; and
   placing the respective weighing cells of said first and second weighing units in communication with said processor and, in said processor, deriving respective weight values and respective associated quality values for said object independently from each of said first and second weighing units.

5. A method as claimed in claim 4 comprising, in said processor, determining, for each of said first and second weighing cells, a preliminary weight value for said object and then determining an object weight of said object as an average of said preliminary weight values.

6. A method as claimed in claim 4 comprising providing said dynamic scale with a plurality of additional weighing units, each comprised of a weighing pan and a weighing cell, said first, second and plurality of further weighing units being situated successively along said transport direction, and comprising, in said processor, deriving valid weight values for at least some of said weighing units by combining said at least some of said weighing units into a group $g_i$, wherein i =1, 3, 5,. . . , and deriving an object weight from a number of groups $g_j$, wherein j is greater than or equal to three of valid weight values.

7. A method as claimed in claim 6 comprising combining weight values between two groups $g_k$ and $g_{k+2}$, wherein k = 1, 3, 5,. . . , into a group $g_{k+1}$, of invalid values, and determining j by comparing the quality values of respective weight values of successive groups $g_{k+1}$ and $g_{k+2}$.

8. A dynamic scale comprising:
   a weighing unit on which an object to be weighed is continuously transported without stoppage on the weighing unit;
   said weighing unit being configured to detect weight information for the object on the weighing unit by performing a plurality of weight measurements of said object;
   a processor provided with said plurality of weight measurements, said processor being configured to select a predetermined number of said weight measurements and to determine a derived weight value, and a quality value for said derived weight value;
   said processor being configured to use said quality value to determine whether said derived weight value is a valid weight value for said object; and
   said processor being configured, if it is determined in said processor that said derived weight value is a valid weight value, to provide a signal from said processor that allows a new object to be continuously transported on the weighing unit.

9. A non-transitory, computer-readable data storage medium encoded with programming instructions, said storage medium being loaded into a processor of dynamic scale that comprises a weighing unit on which an object to be weighed is continuously transported without stoppage on the weighing unit, said programming instructions causing said processor to:
   operate the weighing unit to detect weight information for the object on the weighing unit by performing a plurality of weight measurements of said object;
   automatically select a predetermined number of said weight measurements and determine a derived weight value, and a quality value for said derived weight value;
   use said quality value to determine whether said derived weight value is a valid weight value for said object; and
   if it is determined in said processor that said derived weight value is a valid weight value, provide a signal from said processor that allows a new object to be continuously transported on the weighing unit.

10. A method as claimed in claim 1 comprising performing at least 50 weight measurements per second of said object as said plurality of weight measurements.

11. A method as claimed in claim 1 comprising determining said derived weight value for said object as a running average of said predetermined number of weight measurements.

12. A dynamic scale as claimed in claim 8 wherein said weighing unit is configured to perform at least 50 weight measurements per second of said object as said plurality of weight measurements.

13. A dynamic scale as claimed in claim 8 wherein said processor is configured to determine said derived weight value for said object as a running average of said predetermined number of weight measurements.

14. A non-transitory storage medium as claimed in claim 9 wherein said programming instructions cause said processor to operate said weighing unit to perform at least 50 weight measurements per second of said object as said plurality of weight measurements.

15. A non-transitory storage medium as claimed in claim 9 wherein said programming instructions cause said processor to determine said derived weight value for said object as a running average of said predetermined number of weight measurements.

* * * * *